May 13, 1958     D. W. PESSEN     2,834,363
SELF ADJUSTING CONTROL APPARATUS
Filed Oct. 8, 1954
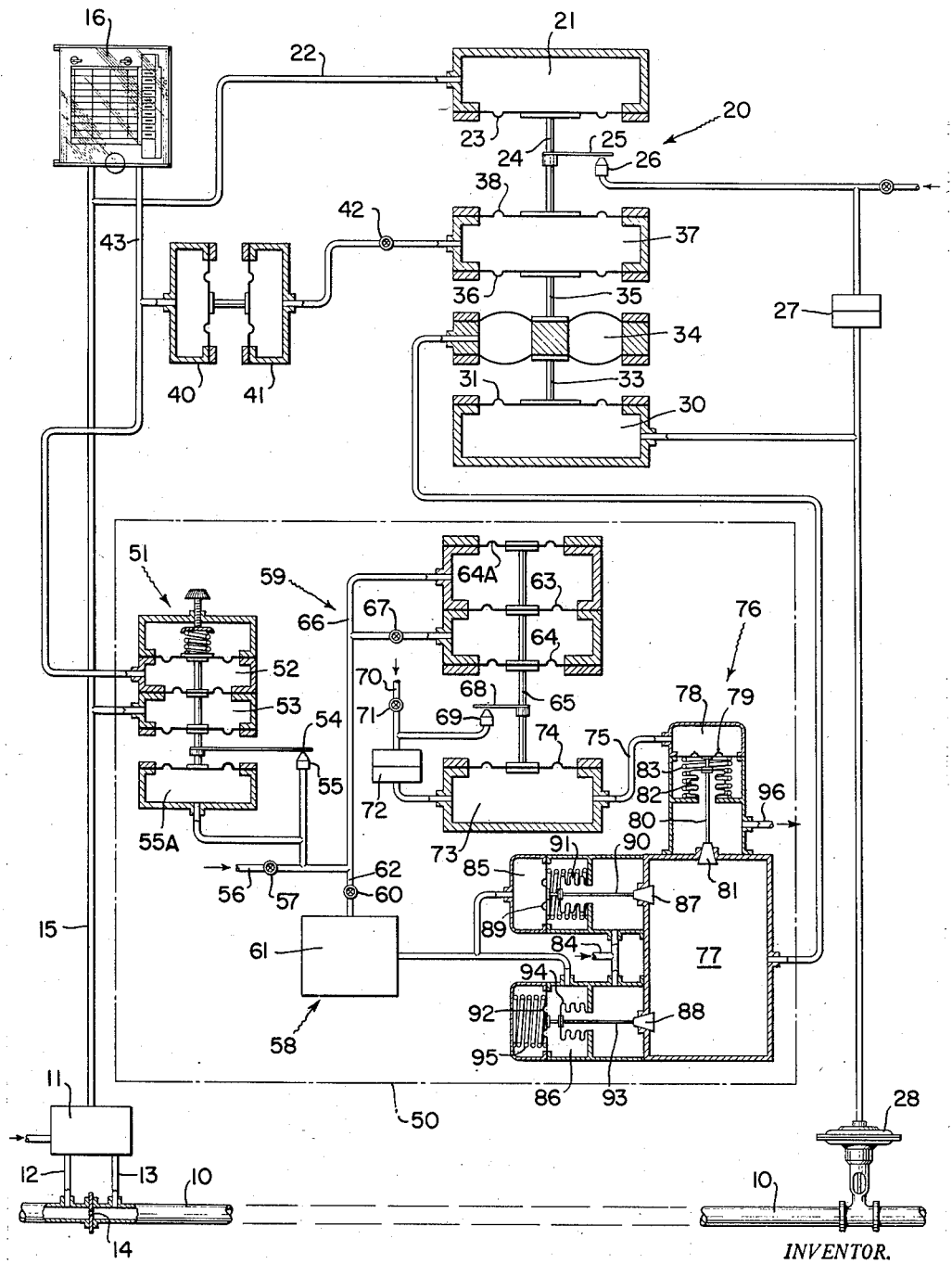
INVENTOR.
DAVID W. PESSEN
BY Arthur H. Swanson
ATTORNEY.

United States Patent Office

2,834,363
Patented May 13, 1958

---

2,834,363

SELF ADJUSTING CONTROL APPARATUS

David W. Pessen, Philadelphia, Pa., assignor to Minneapolis-Honeywell Regulator Company, Minneapolis, Minn., a corporation of Delaware Application October 8, 1954, Serial No. 461,131

8 Claims. (Cl. 137—85)

A general object of the present invention is to provide a new and improved control apparatus which is characterized by its having its control parameters automatically adjusted in accordance with the general stability of a controlled process. More specifically, the present invention is concerned with a self adjusting controller having a deviation signal measuring means which is adapted to produce a pressure signal for use in adjusting the controller.

Automatic controllers are used in the controlling of numerous processes. These controllers are generally of the type which measure the magnitude of a variable to be controlled, compare that magnitude with a set point signal, and produce an output controlling action which is intended and suitably applied to maintain the controlled variable at a desired magnitude. The controllers commonly used in automatic process control include adjustments for effecting changes in the gain or sensitivity of the controller as well as reset or load compensating means, the latter being used to eliminate steady offsets or deviations of the controlled variable from the desired magnitude.

It has been found that in most processes a wide variety of factors, some of which are variable, tend to affect the magnitude of the controlled variable over a period of time. Consequently, a particular set of control parameter adjustments of proportional band and reset on the controller will produce controller stability so long as the factors affecting the controlled variable remain substantially the same. However, if the process conditions change in any way, the controlled variable may take on an undesirable offset or the entire control process may begin to oscillate or cycle due to circuit instability.

The present invention is directed to apparatus adapted for use with a process including suitable and effective provisions operative automatically to adjust the control parameters of the controller. The arrangement preferably is such that the said apparatus is operative to set and maintain the control parameters of the controller at their optimum value, such that they produce minimum offset, and maximum stability.

It is therefore another object of the present invention to provide control parameter adjusting means for an automatic process controller to insure minimum offset and maximum stability.

The foregoing object, in accordance with the present invention, is accomplished generally by a stability meter which observes the condition of the controlled variable in terms of its offset and instability. The stability meter is arranged to separate oscillatory signals of the process from steady state deviations and produce a single pressure signal to adjust the controller control parameters to their optimum value.

Another more specific object of the present invention is to provide a stability measuring apparatus for a self adjusting controller which comprises a high pass filter and a low pass filter which are operative to establish a pressure signal which is adapted for use in adjusting the control parameters of an automatic controller.

Still another more specific object of the present invention is to provide a high pass filter formed by a pair of interconnected pressure deflectable elements defining two chambers one of which is supplied with a pressure signal directly from a signal source and the other which is supplied by way of a restricted inlet and which has an output connection providing an output flapper-nozzle control element.

A still further object of the invention is to provide a stability meter for a self adjusting controller wherein the meter includes a chambered space having a fluid pressure supplied thereto by a low pass filter and means for bleeding this fluid pressure from said chambered space including means controlled by a high pass filter.

The various features of novelty which characterize the invention are pointed out with particularity in the claims annexed to and forming a part of this specification. For a better understanding of the invention, its advantages, and specific objects attained with its use, reference should be had to the accompanying drawings and descriptive matter in which there is illustrated and described a preferred embodiment of the invention.

The drawing is a diagram of apparatus which conducts elastic fluid and which is operated by the pressure thereof.

Referring to the single figure of the drawing, the numeral 10 represents a pipe through which a fluid flows. The rate of the flow of the fluid is adapted to be measured by a differential pressure measuring device or converter 11 having a pair of pressure sensing connections 12 and 13 connected on opposite sides of an orifice plate 14 located within the pipe 10. The differential converter mechanism 11 may be of any conventional type. However, a preferred form of this type of apparatus will be found in the copending application of John Booth et al., bearing Serial No. 248,358, filed September 26, 1951. The output from the differential converter mechanism 11 is a pneumatic pressure which has a magnitude proportional to the flow of the fluid passing through the pipe 10. The output pressure passes by way of an output conduit 15 to a suitable indicating and recording mechanism 16 of any desired type.

The output pressure in the conduit 15 is also supplied to a control indicated generally by the numeral 20 and specifically to the input variable chamber 21 by way of the conduit 22. The chamber 21 has a flexible diaphragm 23 enclosing the lower portion thereof. Fastened to the diaphragm 23 is an actuating rod 24, the latter of which carries a flapper 25 which cooperates with a suitable pneumatic nozzle 26. The back pressure from the nozzle 26 is fed through a pneumatic relay 27 to an ouput control valve 28, the latter of which is used to regulate the flow of the fluid in the pipe 10. The output pressure from the relay 27 is also supplied as a feedback for a balancing chamber 30. This chamber has a diaphragm 31 enclosing the upper end thereof and has connected thereto an output member 33. The output member 33 in turn is connected to the center section of a fluid spring 34 and a further connector or member 35 which connects to a diaphragm 36 on a further chamber 37. The chamber 37 is enclosed on its upper portion by a diaphragm 38, the latter of which has its center section connected to the flapper actuating member 24. A pressure signal is supplied to the chamber 37 from the indicating instrument 16 and this signal is the set point source signal which is fed to the chamber 37 by way of a conduit 43, a pair of chambers 40 and 41, and a restriction 42. A pair of chambers 40 and 41 are employed instead of a direct connection from conduit 43 to chamber 37 in order that the space defined by chamber 37, restriction 42, and chamber 41 be shut off from the surrounding atmosphere. This permits the chambers 37 and 41 to be used as a capacity or volume storage for fluid.

The stability measuring portion of the present apparatus is indicated generally by the apparatus located within the dotted lines 50. This stability measuring apparatus includes a deviation signal producing means 51 which has an input set point signal chamber 52 and a variable sensing chamber 53 each of which have pressure deflectable elements thereon connected to a flapper unit 54. The flapper unit 54 cooperates with a nozzle 55 whose back pressure is fed to a balancing chamber 55A. The nozzle 55 is supplied with a fluid under pressure by way of a conduit 56 and a control restriction 57. The back pressure from the nozzle is also arranged to pass to a low pass filter 58 and a high pass filter 59. The low pass filter comprises a restriction 60 and a capacity chamber 61 connected in series in the conduit 62. This low pass filter is adapted to pass low frequency oscillations or steady state deviations of the measured signal pressure as indicated by the back pressure of the nozzle 55. The high pass filter 59 comprises a pressure deflectable element 63 interconnected by a flapper actuating member 65. The deflectable element 63 defines a pair of chambers, one of which is sealed by a diaphragm 64 and the other of which is sealed by a diaphragm 64A. One of these chambers is fed directly by the pressure signal in conduit 66 and the other of these chambers is fed by a pressure signal through a restriction 67. The flapper actuating member 65 carries a flapper unit 68 which cooperates with a nozzle 69. The nozzle 69 is in turn supplied with a pressure signal by way of an inlet conduit 70 having a restriction 71 in series therewith. The back pressure of the nozzle 69 passes by way of a relay 72 to a feedback or balancing chamber 73 having a pressure deflectable element or diaphragm 74 connected to the flapper actuated member 65. The pressure in the chamber 73 is adapted to flow through the conduit 75 to a valve unit 76 which is adapted to control the outflow of fluid from an integrating chamber 77. Chamber 77 is referred to as an integrating chamber because it algebraically adds or summarizes: (1) the deviations between the set point pressure in chamber 52 and the process variable pressure in chamber 53; and (2) the length of time these deviations persist. This high pass filter is adapted to pass oscillatory deviations of the measured signal which are of a frequency higher than that which will pass through the low pass filter 58. The valve unit comprises an inlet chamber 78 having a diaphragm 79 on one side thereof with the center thereof connected to an actuating member 80 for a tapered plug 81. A sealing bellows 82 is also connected to the actuating member 80 and there is a biasing spring 83 connected between the diaphragm 79 and the support for the bellows 82.

The output from the low pass filter 58 passes to a pair of valve units 85 and 86, each of which valve units controls one of the fluid inlet plugs 87 and 88 for the integrating chamber 77. The valve unit 85 includes a diaphragm 89 having a plug actuating member 90 connected thereto. The apparatus also includes a bellows member 91. The valve unit 86 comprises a diaphragm member 92 which is connected to a plug actuating element 93. A further sealing bellows 94 is included in this mechanism.

In considering the operation of the apparatus, the normal functioning of the controller will be first considered. The apparatus will normally be adjusted with a particular set point signal being supplied by the indicating instrument 16. If the set point signal has the same magnitude as the signal from the differential converter 11, there will be established on the output of the controller a predetermined pressure signal which will maintain the valve 28 in a desired operating position. The variable pressure signal will be supplied by way of a conduit 15 to the chamber 21 and the set point signal will be supplied by way of the conduit 43, chambers 40 and 41, a restriction 42 to the chamber 37. If the pressures in the chambers 21 and 37 are balanced, the flapper 25 will assume a predetermined position with respect to the nozzle 26 and there will accordingly be a predetermined output pressure in the relay 27 and in the control valve 28.

If there should be a change in the magnitude of the flow of the pipe 10, there will be an accompanying change in the pressure on the output of the differential converter 11 and the conduit 15. This pressure signal will be applied to the chamber 21 and will cause a deflection of the flapper 25 with respect to the nozzle 26. This will result in a change in the output pressure from the nozzle 26 and the relay 27 so that there will be a readjustment of the valve 28. The change in pressure in the output of the relay 27 will also be applied to the feedback chamber 30 so that the chamber 30 will have a pressure acting upon the diaphragm 31 which will tend to move the output element 33, the center section of the diaphragm spring 34, and the member 35 to deflect the diaphragm 36. The deflection of the diaphragm 36 will cause the pressure within the chamber 37 to change and act upon the diaphragm 38 to create a balancing force upon the flapper actuating element 24. The force upon the element 24 will cause the flapper 25 to be displaced with respect to the nozzle 26 until the forces in the controller are in balance. The change in pressure upon the valve 28 will create a corrective action upon the flow of the fluid in the pipe 10 so that the flow in the process will be brought back toward its desired control value.

In the event that there should be a steady state offset or a drooping of the control variable from the desired set point signal, the controller will produce an appropriate output controlling action. For purposes of explanation, if there is a steady state offset, the pressure in the variable chamber 21 will be different than the pressure in the set point chamber 37 and there will be a resultant output deflection of the flapper 25. This will cause the output pressure from the nozzle 26 to change and produce a corrective control action upon the valve 28. This output pressure will also be applied to the feedback chamber 30 so that an appropriate feedback signal will be applied to the set point chamber 37. Since the set point chamber 37 has on its inlet a restriction 42 and a capacity chamber 41, the deflection of the diaphragm 36 in the chamber 37 will additionally be reflected to the diaphragm 38. Movement of diaphragm 36 increases or decreases the pressure of the fluid in chamber 37 and this increase or decrease in pressure causes corresponding movement of diaphragm 38 due to the limited capacity of chamber 37 and the resistance of restriction 42. However, the pressure signal within the chamber 37 will tend to dissipate through the restriction 42 into the capacity chamber 41. The rate at which the dissipation takes place is dependent upon the magnitude of the restriction 42. The pressure drop across the restriction 42 is in effect the resultant feedback signal applied to the diaphragm 38 which will provide an appropriate balancing force on the flapper 25. In other words, the pressure in the chamber 30 must be continually changing in a direction to maintain a fixed pressure drop across restriction 42 to thereby maintain a fixed balancing pressure in chamber 37. This resetting action will continue to take place so long as there is a deviation between the variable signal and the desired set point signal. When the offset has been eliminated, the flapper 25 and the nozzle 26 will assume their predetermined relationships so that the desired output control pressure will be applied to the valve 28.

Next to be considered is the operation of the fluid spring 34. This spring comprises a pair of diaphragm units rigidly connected together at their center and at their outer edges. By varying the pressure on the chamber defined by the two diaphragms, it is possible to change the spring gradient of the spring and thereby introduce a variable spring gradient factor into the feedback action from the diaphragm 31 to the diaphragm 36 on the chamber 37. When a high spring gradient is introduced between the feedback diaphragm 31 and the diaphragm 36, the sensitivity of the controller will be increased and the reset rate will be increased. If the spring gradient should be decreased, the reset rate of the controller will decrease and the gain or sensitivity of the controller will decrease.

The spring gradient for the apparatus is determined by the pressure produced in the integrating chamber 77. This pressure is in effect a measure of the stability of the controller. If there is an oscillatory condition in the measured variable, it is desired that the pressure within the chamber 77 decrease. On the other hand, if there is a long term offset, it is desired that the pressure within the chamber 77 increase. The pressure decrease in the chamber 77 is determined by the high pass filter 59 while the pressure increase in the chamber 77 is controlled by the low pass filter 58. The signal for both of the filters 58 and 59 is produced by the deviation sensing means 51.

The deviation sensing means 51 is normally set so that it will produce a predetermined fluid back pressure in the nozzle 55 when there is a predetermined balance between the set point pressure in the chamber 52 and the variable pressure in the chamber 53. If there should be a long term offset so that the pressure of the variable acting in the chamber 53 is either above or below the set point pressure of the chamber 52, the flapper 54 will be displaced with respect to the nozzle 55 so as to produce a pressure different than the normal stabilized pressure. If, for example, the pressure in the nozzle 55 increases, the increase in pressure will be fed through the conduit 62, restriction 60, and capacity chamber 61 to the chamber 85 where the increase in pressure will act upon the diaphragm 89 to deflect the inlet plug 87 to the right. When the plug 87 is deflected to the right, it opens a bleed passage into the chamber 77 from the inlet fluid line 84 and there is an accompanying increase in the pressure in the chamber 77. This pressure increase will be reflected to the diaphragm spring 34 to increase the sensitivity of the controller and also increase the reset rate.

If the pressure deviation should be in the opposite direction so that the nozzle back pressure of nozzle 55 decreases, the signal will be passed through the conduit 62, restriction 60, capacity chamber 61 to chamber 86. The decrease in pressure upon the diaphragm 92 will remove the force acting against the spring 95 and the spring 95 will accordingly move the bleed plug 88 to the right. This will also effect a bleed into the chamber 77 from the inlet fluid line 84 so that the chamber pressure will increase. As before, this pressure increase will be reflected to the diaphragm spring 34 and the sensitivity of the controller will increase as will the reset rate.

A long term offset of the type just considered will be blocked from the valve unit 76 by means of the high pass filter 59. This blocking action is due to the fact that the long term offset signal transmitted through the pipe 66 will pass through restriction 67 into the chamber bounded by diaphragm 64 and 63, and will therefore cancel the pressure in the chamber bounded by diaphragm 63 and 64A. The frequency at which there is effective blocking of the long term offset is determined by the setting of the restriction 67. In other words, the long term offset is a slow change in pressure. This change is so slow that the delay imposed by restriction 67 in the change in pressure passing from pipe 66 to the chamber bounded by diaphragms 64 and 63 is negligible. The pressures on the opposite sides of diaphragm 63 change at substantially the same rate.

If there should be an oscillation of the process as indicated by the cyclic signal fluctuation in the chamber 53, there will be an accompanying cyclic operation of the back pressure of the nozzle 55. This cyclic pressure signal will pass to the high pass filter 59 by way of the conduit 66. If the frequency of the cyclic fluctuation is high enough, the effect of the restriction 60 and the capacity chamber 61 will be to prevent the signals from being applied to the fluid inlet plug actuators 87 and 88. With a cyclic signal applied to the high pass filter 59, the cyclic signal will be applied directly to the chamber enclosed on the bottom by the diaphragm 63. The cyclic signal will effectively be blocked from the chamber defined by the diaphragm 63 and 64 due to the action of the restriction 67 and the capacity of the chamber defined by the two diaphragms. The frequency at which the restriction and capacity becomes effective is determined by their respective sizes. Consequently, only the diaphragm 63 will have a cyclic pressure signal applied to its upper side thereof and there will be a resultant cycling of the flapper-actuator 65. This will cause movement of the flapper 68 with respect to the nozzle 69 so that there will be a cyclic pressure signal applied to the relay 72 and then to the feedback chamber 73. The cyclic pressure signal will act upon the diaphragm 74 which will tend to balance the input signal upon the diaphragm 63. Further, the cyclic signal in the chamber 73 will be fed through the conduit 75 to the chamber 78 of the valve unit 76. The cyclic signal acting upon the diaphragm 79 which encloses the chamber 78 will cause the member 80 to be deflected downwardly and when it is so deflected the pressure signal within chamber 77 may be bled to atmosphere by conduit 96, so that the pressure within the chamber 77 will decrease. The decrease in chamber pressure will then be applied to diaphragm spring 34 and there will be a decrease in the spring gradient of the spring 34. This will cause the sensitivity or gain of the controller to decrease and there will be a decrease in the reset rate. This pressure in the chamber 77 will continue to decrease until such time as the cyclic fluctuation of the variable is eliminated. The springs in the valve units 76, 85 and 86 may be selected so that their respective values open until a certain magnitude of deviation has taken place. This is done to prevent the stability meter from responding to minute process offsets or to process noise.

By reason of the automatic action of the self adjusting mechanism of the stability measuring apparatus, the controller parameters, gain and reset, are set at a value which will give maximum sensitivity and maximum reset rate without any accompanying instability of the variable in the process.

It will be readily apparent to those skilled in the art that the pneumatic principles employed in the controller and stability sensing means may be duplicated by equivalent electrical components.

While, in accordance with the provisions of the statutes, there has been illustarted and described the best forms of the embodiments of the invention known, it will be apparent to those skilled in the art that changes may be made in the form of the apparatus disclosed without departing from the spirit of the invention as set forth in the appended claims, and that in certain cases, certain features of the invention may be used to advantage without a corresponding use of other features.

Having now described the invention, what it is desired to secure by Letters Patent is:

1. A self adjusting controller comprising, a controller apparatus for producing an output controlling action in accordance with the magnitude of an input variable, a single controller gain and reset adjusting means connected to said controller to regulate the response of the controller to changes in the magnitude of the input variable, a stability meter connected to said adjusting means, said stability meter comprising a chambered space, means connected to supply a fluid pressure to said space upon the presence of steady state deviation of the input variable, and means connected to bleed fluid pressure from said space when there is an oscillatory deviation of the input variable, and means connected to and responsive to the fluid pressure in said space and operable to adjust said adjusting means.

2. A self adjusting controller comprising, a controller apparatus for producing an output controlling action in accordance with the magnitude of an input variable, a single controller adjusting means connected to said controller to regulate the proportional and reset response of the controller to changes in the magnitude of the input variable, and a stability meter connected to said adjusting means, said stability meter comprising a chambered space, a low pass filter connected to supply a fluid pressure to said space upon a steady state deviation of the input variable, a high pass filter connected to bleed fluid pressure from said space upon an oscillatory deviation of the input variable, means connecting said high and low pass filters to a deviation signal sensing means, and means connected to and responsive to the fluid pressure in said space and operable to adjust said adjusting means.

3. Self adjusting mechanism for an automatic controller comprising, a fluid spring operable in response to a pressure signal, and a stability measuring means connected to supply a variable fluid pressure to said spring, said stability measuring means comprising, a deviation signal source, a high frequency signal deviation pass filter connected to said source, a low frequency signal deviation pass filter connected to said source, an integrating chamber connected to the output of said low pass filter so that said chamber will have a pressure signal supplied thereto by said low pass filter upon a steady state change of the deviation signal, means connecting said high pass filter to bleed the pressure signal from said integrating chamber upon an oscillatory change of the deviation signal, and means connecting said fluid spring to said integrating chamber.

4. Apparatus as described in claim 3 wherein said high pass filter comprises three interconnected pressure deflectable elements defining two chambers in an enclosed space, means connecting both of said chambers to said signal source, a fluid restriction in the connection to one of said chambers, and a fluid flapper-nozzle mechanism connected to both of said elements to be displaced to produce an output pressure when the pressures in said chambers are not balanced.

5. A self adjusting controller mechanism comprising a chamber having fluid under pressure supplied thereto, a pair of inlet ports to said chamber, a first fluid pressure responsive means responsive to a signal deviation below a predetermined magnitude, means connecting said first responsive means to regulate one of said inlet ports, a second fluid pressure responsive means responsive to a signal deviation above a predetermined magnitude, means connecting said second responsive means to regulate the other of said inlet ports, and a low pass filter connected to supply a fluid pressure signal to both of said first and second fluid pressure responsive devices upon a steady state change of the deviation signal.

6. Apparatus as defined in claim 5 wherein said chamber has an outlet fluid pressure connection to a controller-adjusting fluid spring.

7. An automatic controller for regulating the magnitude of a variable, said controller having proportional response adjusting means, a controller stability sensing means connected to respond to the operation of said controller comprising a low pass signal filter connected to a signal storage means to produce an integrated steady state deviation signal and a high pass signal filter mechanically separate from said low pass filter and connected to said signal storage means to remove the integrated signal in accordance with the magnitude of an oscillatory condition in the operation of said controller, and control means connecting said storage means to said controller response adjusting means to regulate the automatic controlling effect of said controller.

8. Apparatus as defined in claim 7 wherein said controller has a single proportional and reset response adjusting means.

References Cited in the file of this patent
UNITED STATES PATENTS 2,517,081    Caldwell _____ Aug. 1, 1950